(12) United States Patent
Fang et al.

(10) Patent No.: US 10,028,165 B2
(45) Date of Patent: Jul. 17, 2018

(54) REVERSE LINK RELIABILITY THROUGH RE-ASSEMBLING MULTIPLE PARTIALLY DECODED CONNECTIONLESS FRAMES IN WIRELESS COMMUNICATION NETWORKS

(71) Applicants: ZTE Corporation, Shenzhen (CN); ZTE (USA) Inc., Morristown, NJ (US)

(72) Inventors: Yonggang Fang, San Diego, CA (US); YuanFang Yu, Shenzhen (CN); Ting Lu, Beijing (CN); Xiaowu Zhao, Shenzhen (CN)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 0 days.

(21) Appl. No.: 13/890,195

(22) Filed: May 8, 2013

(65) Prior Publication Data

US 2013/0242734 A1 Sep. 19, 2013

Related U.S. Application Data

(63) Continuation-in-part of application No. 12/807,358, filed on Sep. 1, 2010.

(30) Foreign Application Priority Data

Feb. 26, 2010 (WO) ................ PCT/CN2010/070793

(51) Int. Cl.
*H04W 4/00* (2018.01)
*H04W 28/02* (2009.01)
(Continued)

(52) U.S. Cl.
CPC ....... *H04W 28/0252* (2013.01); *H04W 48/16* (2013.01); *H04W 52/10* (2013.01);
(Continued)

(58) Field of Classification Search
None
See application file for complete search history.

(56) References Cited

U.S. PATENT DOCUMENTS 5,260,943 A 11/1993 Comroe et al.
6,256,321 B1 7/2001 Kobayashi
(Continued)

FOREIGN PATENT DOCUMENTS

KR 10-2006-0049749 5/2006
KR 10-2007-0069929 7/2007
(Continued)

OTHER PUBLICATIONS

"CDMA2000 High Rate Packet Data Air Interface Specification," 3rd Generation Partnership Project 2 (3GPP2), 3GPP2 C.S0024-B, Version 3.0, Sep. 2009 (1,520 pages).
(Continued)

*Primary Examiner* — Mohamed A Wasel
*Assistant Examiner* — Tsung Y Wu
(74) *Attorney, Agent, or Firm* — Perkins Coie LLP (57) ABSTRACT

Techniques, devices, and systems that include mechanisms for connectionless communications in wireless communication networks or systems include a base station controller, a plurality of base stations and a mobile station. The base station controller combines connectionless transmissions received by the base stations, including decoded and undecoded frames, into a complete message.

18 Claims, 7 Drawing Sheets

Related U.S. Application Data (60) Provisional application No. 61/239,032, filed on Sep. 1, 2009, provisional application No. 61/241,377, filed on Sep. 10, 2009, provisional application No. 61/244,416, filed on Sep. 21, 2009, provisional application No. 61/644,373, filed on May 8, 2012.

(51) Int. Cl.
| | | |
|---|---|---|
| *H04W 48/16* | (2009.01) | |
| *H04W 52/10* | (2009.01) | |
| *H04W 52/50* | (2009.01) | |
| *H04W 74/08* | (2009.01) | |
| *H04W 52/12* | (2009.01) | |
| *H04W 52/14* | (2009.01) | |
| *H04B 7/022* | (2017.01) | |

(52) U.S. Cl.
CPC ............ *H04W 52/50* (2013.01); *H04W 74/08* (2013.01); *H04B 7/022* (2013.01); *H04W 52/12* (2013.01); *H04W 52/146* (2013.01)

(56) References Cited

U.S. PATENT DOCUMENTS

| | | | |
|---|---|---|---|
| 6,714,528 B1 | 3/2004 | Moon et al. | |
| 6,985,732 B1 | 1/2006 | Ekman et al. | |
| 7,130,657 B1* | 10/2006 | Sampath | H04L 1/0057 |
| | | | 370/332 |
| 7,684,523 B2* | 3/2010 | Wang et al. | 375/342 |
| 7,809,012 B2 | 10/2010 | Ruuska et al. | |
| 7,847,730 B2 | 12/2010 | Ryba | |
| 7,898,952 B2 | 3/2011 | Kim et al. | |
| 8,189,719 B2 | 5/2012 | Barriac et al. | |
| 8,437,769 B1 | 5/2013 | Sarkar et al. | |
| 2002/0028689 A1 | 3/2002 | Iwami et al. | |
| 2002/0032760 A1 | 3/2002 | Matthews et al. | |
| 2002/0072385 A1* | 6/2002 | Salvarani et al. | 455/522 |
| 2002/0118665 A1 | 8/2002 | Cleveland et al. | |
| 2002/0140963 A1* | 10/2002 | Otsuka | 358/1.14 |
| 2002/0196840 A1 | 12/2002 | Anderson et al. | |
| 2003/0139140 A1* | 7/2003 | Chen | H04B 7/022 |
| | | | 455/67.11 |
| 2003/0186714 A1 | 10/2003 | Vihriala | |
| 2004/0001460 A1* | 1/2004 | Bevan | H04B 7/022 |
| | | | 370/331 |
| 2004/0192208 A1* | 9/2004 | Kong et al. | 455/63.1 |
| 2005/0030964 A1* | 2/2005 | Tiedemann, Jr. | H04L 1/0002 |
| | | | 370/431 |
| 2005/0208959 A1 | 9/2005 | Chen et al. | |
| 2005/0282547 A1 | 12/2005 | Kim et al. | |
| 2006/0013185 A1 | 1/2006 | Seo et al. | |
| 2006/0056354 A1* | 3/2006 | Vasudevan et al. | 370/332 |
| 2006/0164987 A1 | 7/2006 | Ruiz Floriach et al. | |
| 2007/0076682 A1 | 4/2007 | Kim et al. | |
| 2007/0253372 A1 | 11/2007 | Nakayasu | |
| 2007/0275746 A1 | 11/2007 | Bitran | |
| 2008/0242321 A1* | 10/2008 | Inoue et al. | 455/458 |
| 2009/0042594 A1 | 2/2009 | Yavuz et al. | |
| 2009/0280828 A1 | 11/2009 | Wang et al. | |
| 2010/0124200 A1 | 5/2010 | Ergen et al. | |
| 2011/0085497 A1 | 4/2011 | Fang et al. | |
| 2011/0190002 A1 | 8/2011 | Hosono | |
| 2011/0281581 A1 | 11/2011 | Brandt et al. | |

FOREIGN PATENT DOCUMENTS

| | | | |
|---|---|---|---|
| WO | WO 2008155764 A2 * | 12/2008 | H04B 7/022 |
| WO | WO -2008155764 A2 * | 12/2008 | H04B 7/022 |
| WO | 20101063327 | 6/2010 | |

OTHER PUBLICATIONS

"E-UTRAN—CDMA2000 HRPD Connectivity and Inter-working: Air Interface Specification," 3rd Generation Partnership Project 2 (3GPP2), 3GPP2 No. C.S0087-0 v2.0, Jan. 2010 (409 pages).

3GPP2, "CDMA2000 High Rate Packet Data Air Interface Specification," 3GPP2 C.S0024-B, Version 1.0, pp. 11-1 to 11-84, Apr. 2006.

IEEE Standard 802.2, Logical Link Control, 1998, IEEE, pp. 1-45.

International Search Report and Written Opinion dated May 30, 2011 for International Application No. PCT/US2010/002422, filed Sep. 1, 2010 (8 pages).

Kapoor, R., et al., "Bluetooth: Carrying Voice over ACL Links," IEEE, pp. 379-383, (2002).

Wang, S., et al., "Access Probe Enhancements," U.S. Appl. No. 61/091,718, filed Aug. 25, 2008, 21 pages.

Wang, S., et al., "Access Probe Enhancements," U.S. Appl. No. 61/052,583, filed May 12, 2008, 14 pages.

Zhao, Q., et al., "A Connectionless Approach to Large Scale Sensor Networks," IEEE Military Communication Conference, MILCOM 2004, pp. 197-203, (2004).

* cited by examiner

FIG. 5 RL Cellless Configuration for Connectionless Combining/Re-assembling

FIG. 6

Connectionless Packet Combining

FIG. 7

Connectionless Packet Combining

FIG. 8

REVERSE LINK RELIABILITY THROUGH RE-ASSEMBLING MULTIPLE PARTIALLY DECODED CONNECTIONLESS FRAMES IN WIRELESS COMMUNICATION NETWORKS

CROSS REFERENCE TO RELATED APPLICATIONS

This patent document is a continuation-in-part of and claims priority to U.S. patent application Ser. No. 12/807,358, filed on Sep. 1, 2010, which claims the benefit of priority of U.S. Provisional Patent Application No. 61/239,032, filed on Sep. 1, 2009; U.S. Provisional Patent Application No. 61/241,377, filed on Sep. 10, 2009; U.S. Provisional Patent Application No. 61/244,416, filed on Sep. 21, 2009; and International Patent Application No. PCT/CN2010/070793, filed on Feb. 26, 2010.

This patent document also claims the benefit of priority of U.S. Provisional Patent Application No. 61/644,373, filed on May 8, 2012.

The entire contents of the before-mentioned patent applications are incorporated by reference as part of the disclosure of this application.

BACKGROUND

This document relates to wireless communications in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base stations can be referred to as an access point (AP) or access network (AN) or can be included as part of an access network. Further, a wireless communication system can include one or more core networks to control one or more base stations.

A wireless device can use one or more different wireless technologies for communications. Various wireless technologies examples include Code division Multiple Access (CDMA) such as CDMA2000 1x, High Rate Packet Data (HRPD), and Long-Term Evolution (LTE), Worldwide Interoperability for Microwave Access (WiMAX). In some implementations, a wireless communication system can include multiple networks using different wireless technologies.

SUMMARY

This document describes technologies, among other things, for wireless communications between radio stations such as wireless devices and base stations.

In one aspect, techniques for wireless communications can include operating one or more radio networks such as base stations to monitor multiple reverse link wireless channels to receive radio signal transmitted from a wireless device. Reverse link wireless channels can include a reverse link connectionless channel associated with unscheduled communications from one or more wireless devices.

In another aspect, techniques for wireless communications can include operating multiple sectors of a radio network or multiple radio networks to combine the radio signals received over multiple reverse link connectionless channels, and then demodulate and decode the combined radio signal for improving reverse link signal quality and reliability.

In another aspect, techniques for wireless communications can include operating multiple sectors of a radio network or multiple radio networks such as base stations to partially decode radio signals received over multiple reverse link connectionless channels, and then re-assembling the partially decoded radio signal into a complete reverse link connectionless data packet for reducing radio signal errors caused by radio link variation during the radio signal transmission from the wireless device.

In another aspect, techniques for wireless communications can include monitoring a wireless communication channel for an access probe sent from a wireless device; extracting a base station identifier from the access probe, wherein the base station identifier is included in the access probe to identify a base station whose radio signal is received by the wireless device; and operating the base station to transmit an acknowledgement to the wireless device.

In another aspect, techniques for wireless communications can include wireless station and radio network configurations to form a reverse link cell-less transmission so as to make the reverse communication between wireless station and radio networks over the best reverse link and the forward communication over the best forward link.

Other implementations can include corresponding systems, apparatus, and computer programs, configured to perform the actions of the techniques, encoded on computer readable mediums such as computer storage devices.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

Various wireless communication systems can use a connection oriented mode for wireless transmissions over an air link interface. For a connection oriented mode transmission, a wireless device first sets up a traffic channel connection with an access network before transmitting user data packets. A connection oriented mode transmission can be used for data streaming applications such as voices, videos, and file transfers to ensure service quality. After a connection is set up, radio stations such as a mobile station and base station can use one or more traffic channels to send data packets. In such a connection oriented mode, a wireless device or the radio network cannot send a data packet without the connection, which may result in some initial delay in data transmission. Once the connection is setup, the radio resource is dedicated for the particular connection to the wireless device, and remains reserved or occupied for the connection until the connection is released even when the wireless device or the radio network does not have data to send.

In many connection oriented wireless communication systems, the physical link contains the forward and reverse link common control channels such as reverse link access channel and forward link paging channel in CDMA2000 1× network, or reverse link access channel and forward link control channel in CDMA2000 HRPD network; and one or more dedicated traffic channels. The forward and reverse link common control channels are used to provide a way for the mobile stations to initiate a connection to the radio network, and for the radio network to page the mobile station to establish a connection respectively. The forward and reverse link common control channels normally carry the signaling for establishment or releasing of traffic channels. The dedicated traffic channel is assigned by the radio network to a particular mobile station upon receiving connection request. Once the connection is established, the mobile station can use the dedicated traffic channels to communicate with the radio network.

Since the connection oriented transmission requires to establish a connection before the mobile station sends any user packet, it might cause some undesired transmission delay for some data applications such as the push-to-talk, instant data messages and others. In addition, the connection oriented transmission may still occupy radio resource even the mobile station or radio network has no more data to send. This might cause to use up of all the radio resources when many connections are kept alive. Reducing the inactivity timer would help the radio network to force the mobile stations to enter the Idle state and release the some radio resource quickly after mobile station or radio network finish transmission. However, if the mobile station has short burst data to send, it has to re-establish a connection. If the connection is released too soon and too often, it would cause too many signalings between the mobile station and the radio network, which might congest the signaling channel.

For burst type data applications where bursts of data are frequently transmitted, connection oriented mode transmissions may result in delays for short packet transmissions, additional battery consumption, and consume additional wireless resources. Examples of such burst applications include various web browsing applications, short messages, instant messaging, e-mails, gaming, machine-to-machine (M2M) communications (e.g., vending machine, monitoring system, meter reading, environment sensing). In such applications, packet size for a burst is small and transmission is not constant and periodic. Hence, it is not efficient to transmit the burst data via connection oriented mode. Other various data applications such as push-to-talk and gaming applications may require lower latency. The initial delay in establishing the connection in the connection oriented mode may adversely affect the user experience in these and other applications where low latency is desired by users.

This document includes various connectionless mode data transmission mechanisms for wireless communications. Such connectionless mode data transmission mechanisms can provide instant data transmission without establishing a connection and reserving radio resource for the connection. Such connectionless mode data transmission mechanisms can provide an efficient way for burst data transmission without the initial delay.

In some implementations, channel capacity can be expendable through system configuration of multiple connectionless channels.

The described connectionless channel mechanisms can improve the reverse link connectionless (or access) channel reliability via combining and/or assembling of received signals from multiple sectors of a base station or multiple base stations through the reverse link cell-less configurations in a ubiquitous network with multiple virtual cells each centered at a mobile station rather than a base station.

Figure 1:
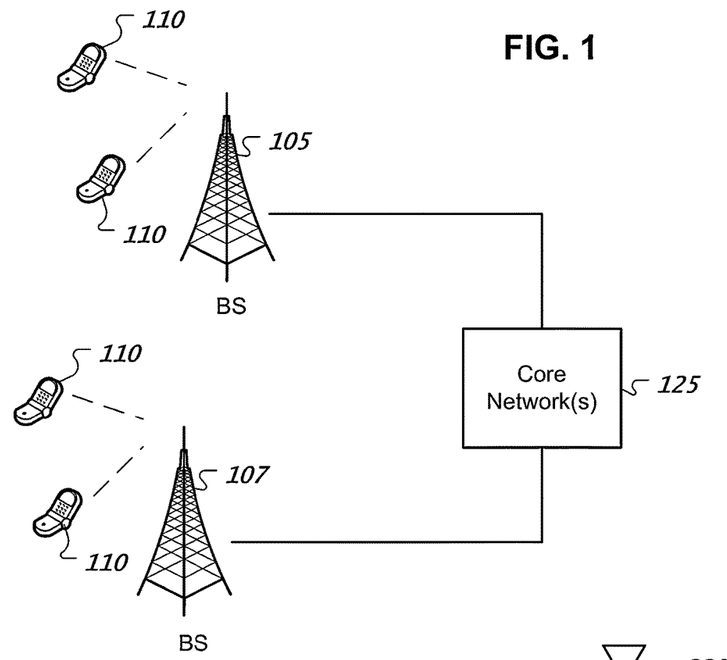
FIG. 1 shows an example of a wireless communication network for serving wireless devices.

FIG. 1 shows an example of a wireless communication network or system. This wireless communication network can include one or more base stations (BSs) 105, 107 and one or more wireless devices 110. A base station 105, 107 can transmit a signal on a forward link (FL), or known as a downlink (DL) signal, to one or more wireless devices 110. A wireless device 110 can transmit a signal on a reverse link (RL), or known as an uplink (UL), to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1×, High Rate Packet Data (HRPD), Long-Term Evolution (LTE), Universal Terrestrial Radio Access Network (UTRAN), and Worldwide Interoperability for Microwave Access (WiMAX).

Figure 2:
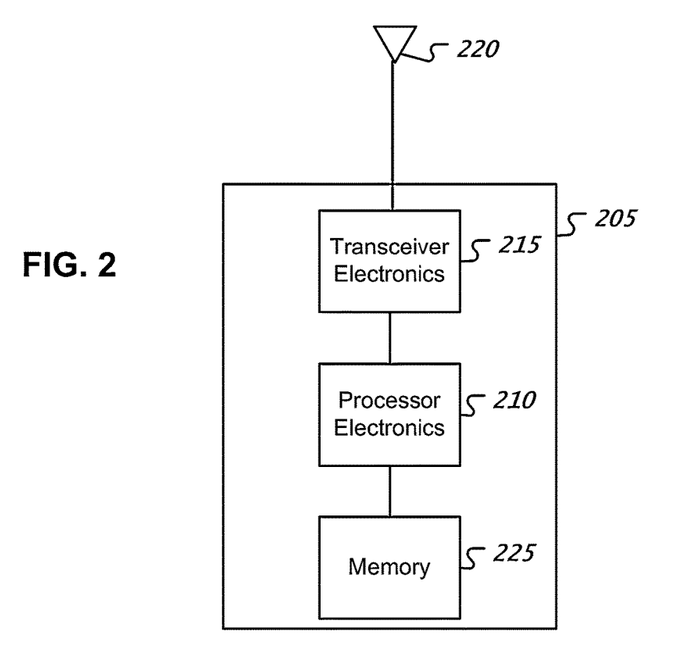
FIG. 2 shows an example of a radio transceiver station that can be used to for constructing the wireless devices or base station sin FIG. 1.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA air interface. In some implementations, radio stations 205 can communicate with each other based on an orthogonal frequency-division multiplexing (OFDM) technology which can include Orthogonal Frequency-Division Multiple Access (OFDMA) technology.

A radio station such as a wireless device or a base station can use one or more connectionless mechanisms to transmit and received unscheduled transmission. In some implementations, a connectionless transmission for a wireless communication system such as one based on CDMA2000 is a communication between radio stations in which a packet can be sent without prior scheduling. A connectionless communication mechanism can include one or more Reverse Link (RL) connectionless channels. A RL connectionless channel, which is identified by the long code mask specified by a radio network. Mobile stations in the connectionless state can share a RL connectionless channel with other mobile stations for short data burst transmission. A mobile station can send burst data over a RL connectionless channel at anytime. The radio network can monitor the RL connectionless channel. A connectionless communication mechanism can include one or more RL connectionless channels and their setting, RL connectionless channel selection, and combining and/or re-assembling the received data.

Connectionless transmission mechanisms described in this document provide a way for combining and/or re-assembling the received data from multiple sectors for a base stations or multiple base stations. Such Mechanisms may help wireless communication systems to improve reverse link connectionless channel reliability and increase wireless communication capacity. Providing connectionless transmission supports expendable connectionless channel capacity through system configuration of multiple connectionless channels.

A mobile station can use the connectionless transmission mechanism to transmit the short data packet over the reverse link connectionless channel at anytime. The connectionless transmission is divided into transmission probe sequences $\{1, 2, \ldots N_S\}$. This is illustrated in FIG. 3.

Figure 3:
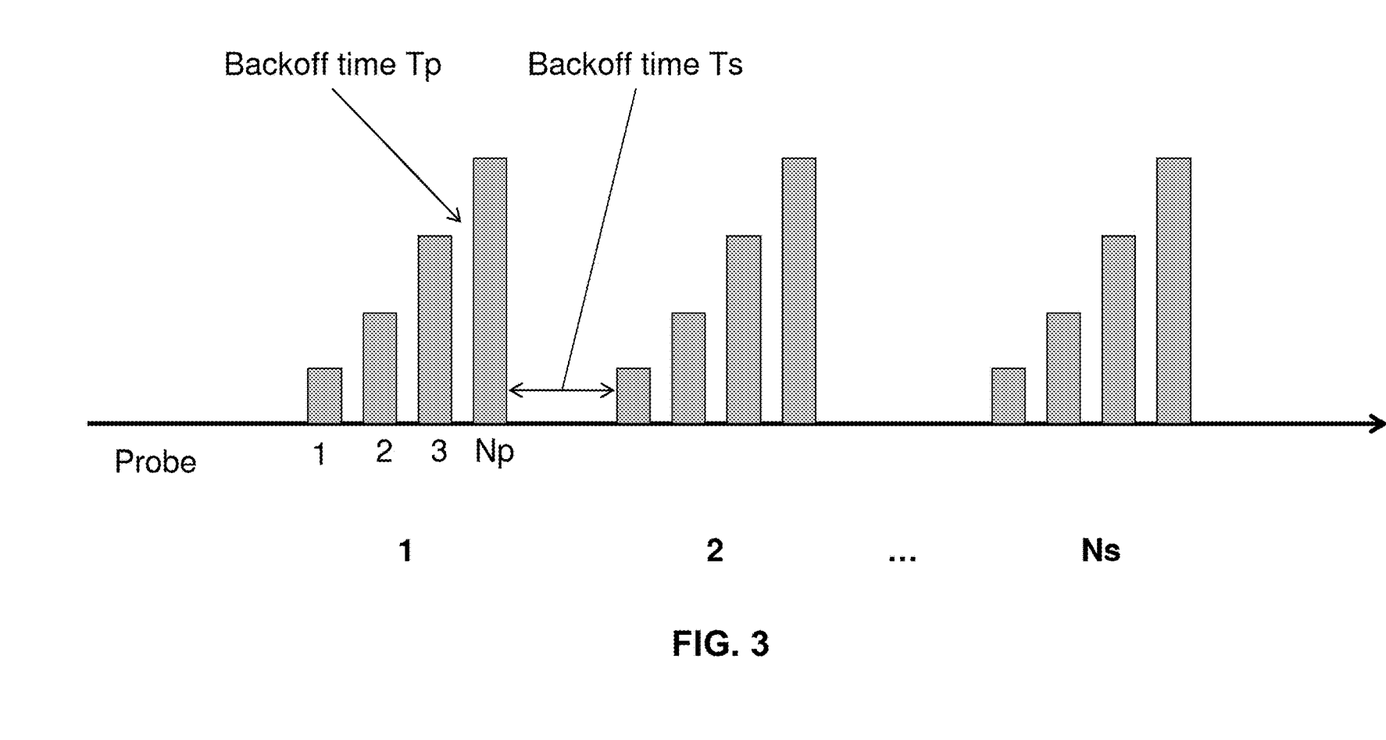
FIG. 3 shows an example of a reverse link connectionless transmission.

In FIG. 3, in each transmission sequence such as 1, the transmission is further divided into $N_p$ probes. The mobile station starts the transmission from Sequence 1, Probe 1 with the initial transmit power. If the mobile station receives the acknowledgement from the radio network, it will stop the transmission of connectionless probe and may prepare for the next short burst data transmission if any. Otherwise, the mobile station will wait for a backoff time $T_p$ to start the retransmission of connectionless probe with increment of initial transmit power. If the mobile station still does not receive the acknowledgement from the radio network after transmitting the $N_p$th connectionless probe, it will wait for the longer backoff time $T_s$ to start retransmitting the connectionless probe at the probe sequence 2. If the mobile station has transmitted the last connectionless probe $N_p$ at the Sequence $N_s$, it will stop further transmission and report the connectionless transmission failure to upper layer protocols.

In a CDMA2000 network, a reverse link channel is identified by a PN sequence. All the PN sequences are generated from a single PN source. Two different PN sequences are of difference phases from the single PN source. Therefore any PN sequence could be generated from the PN source with a unique public long code mask. The public long code mask is a 42 bits long of binary stream. Each bit of a public long code mask could be set to 0 or 1. If one or two bits are different in the two public long code masks, then the PN sequences generated from those two public long code masks could be considered as completely randomized and independent to each other. With this characteristic of PN sequence, a public long code mask can be used to identify the reverse link connectionless channel.

The reverse link reliability of connectionless transmission can be improved through the described combining or re-assembling of received signals at multiple sectors of a base station or at multiple base stations through the reverse link cell-less configurations. The reverse link cell-less configuration is used to form a ubiquitous network with multiple virtual cells centered at each mobile station via provisioning the adjacent cells with same public long code mask of the reverse link connectionless channel.

Figure 4:
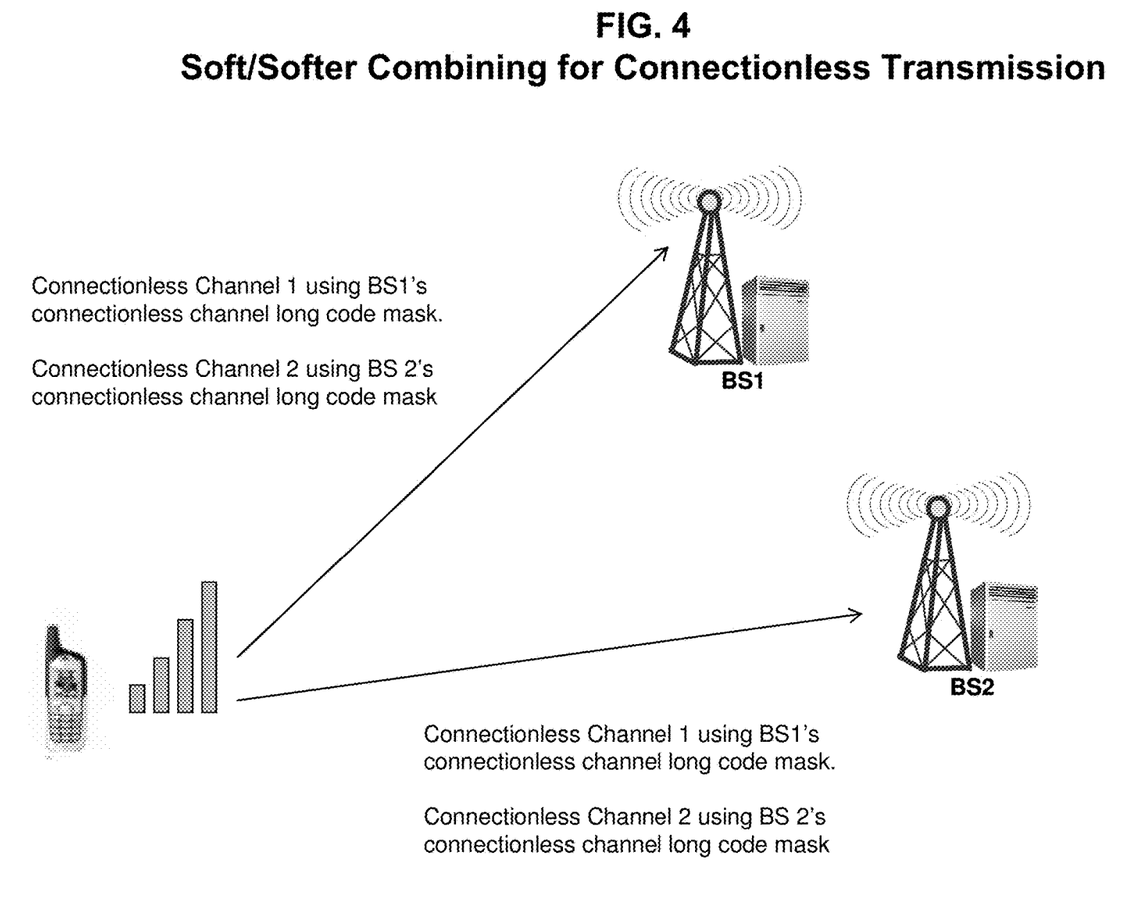
FIG. 4 shows an example of soft/softer combining for connectionless transmission.

As shown in FIG. 4, the radio network 1 (e.g. BS1) is a neighbor of radio network 2 (BS2). The two neighbor radio networks are configured to have two reverse link connectionless channels.

In FIG. 4, the first (or primary) reverse link connectionless channel is configured to use its own reverse link public long code mask to receive the reverse link connectionless probes from mobile stations in its cell or sector. The second reverse link connectionless channel is configured to use its neighbor cell's reverse link public long code mask to receive the connectionless probes from the mobile stations sending to the neighbor cell. When a mobile station in the edge of BS1 and BS2 is transmitting a reverse link connectionless probe, for example to BS1, both radio networks BS1 and BS2 could receive the probe from either the first reverse link connectionless channel or the second connectionless channel. If either radio network BS1 or BS2 receives a connectionless probe from the mobile station, it will send the acknowledgement message back to the mobile station to stop further transmitting connectionless probes. Meanwhile the radio network which receives the connectionless probe successfully will pass the decoded user's packet to the upper layer protocols for further processing.

Figure 5:
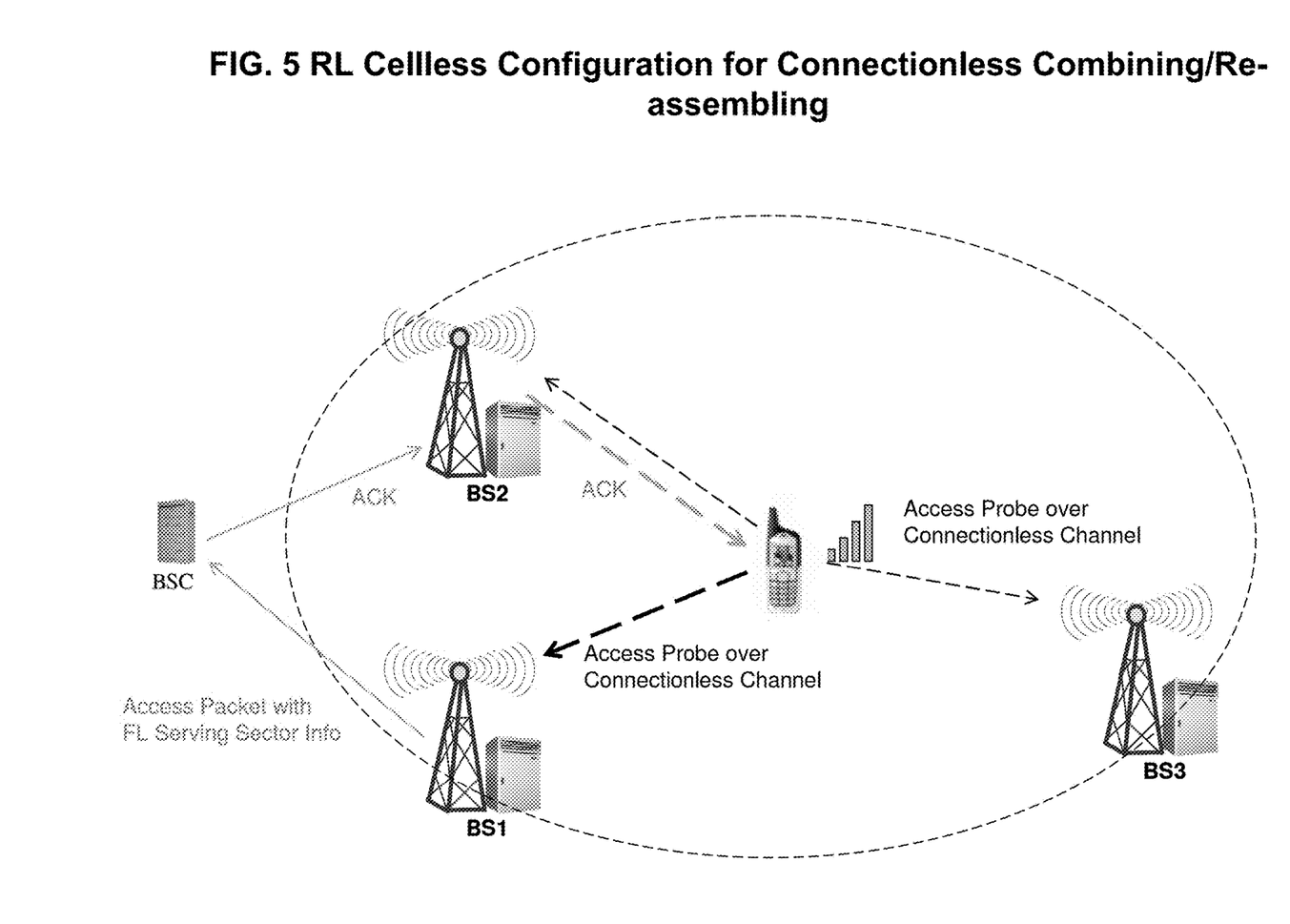
FIG. 5 shows an example of reverse link cell-less configuration for connectionless soft/softer combining/reassembling and balancing forward and reverse links.

FIG. 5 shows an example of improving reverse link reliability through the configuration of a reverse link connectionless channel at multiple sectors of a base station or at multiple base stations and balancing the forward link and reverse link. All the radio networks (e.g. BS1, BS2, and BS3) are configured with a reverse link connectionless channel using the same reverse link public long code mask. After initialization, all the radio networks continue monitoring the reverse link connectionless channel. Therefore this configuration forms a cell-less coverage on the reverse link. When a mobile station is in the coverage of the radio networks, no matter where it is in a particular cell of base station, the mobile station could transmit anytime a short burst data over the connectionless channel. If the mobile station is close to one radio network such as BS1, then the connectionless probe may only be received by the radio network BS1. In another example, if the mobile station is coverage overlapped by multiple radio networks such as BS1, BS2, and BS3, the connectionless probe sent from the mobile station may be received by all the radio networks.

If only one base station receives an access probe over connectionless channel, it will forward the packet to the network node such as base station controller (BSC). If more than one sectors of a base station receives the same access probe over the reverse link connectionless channels, these sectors of base station may combine the received access signals over connectionless channels at base band level. If multiple base stations receive the connectionless probe from the mobile station, these base stations will decode the received connectionless probe and forward the packet to the BSC. BSC then processes received connectionless packets according to their signal quality associated with the decoded packet.

If the signal quality of the decoded connectionless packets is good, the BSC will send an ACK to the base station which is best forward link to the mobile station. In the example of FIG. 5, the BSC receives the connectionless (or access) packet from BS1, and sends an ACK to the BS2 which is of the best forward link to mobile station, The BS2 then sends the ACK to the mobile station to indicate the receipt of its connectionless probe transmission.

If the signal quality of data frames in the connectionless probe are not all good, the BSC can reassemble the partially decoded connectionless data frames from the multiple base stations into a complete probe packet. If all the data frames after reassembling are of good quality, then the BSC can send an ACK to the base station for forwarding to the mobile station.

A connectionless channel probe consists of a preamble frame and one or more data frames. The preamble frame is used for the synchronization and data frame(s) are used to carry the signal or user data. In cdma2000 1×, for example, the reverse link enhanced access channel (R-EACH) can be configured as a reverse link connectionless channel, and the number of data frames on R-EACH is configured through the access parameter message.

Radio condition could change from time to time in the real deployment. When an connectionless (or access) channel probe contains more than one data frames, the radio link condition in the time between data frames could change significantly, which may cause some data frames can be decoded while other data frames cannot be decoded successfully by one or more base stations. In other word, base stations may partially decode a connectionless (or access) probe in this situation. In the existing wireless technology, if one of data frames in the connectionless (or access) probe is un-decoded, the base station considers this access probe as failure and discards it. Therefore the mobile station has to re-transmit the access probe after backoff time.

As disclosed in this document, connectionless transmission mechanism, connectionless (or access) channel(s) are configured at one base station or multiple base stations. When multiple connectionless channels are configured, the re-assembling or combining could be achieved in MAC and/or above layers via integrating multiple partially decoded frames into a complete connectionless message. Therefore this channel variation can be improved or solved using the connectionless (or access) channel macro diversity of multiple connectionless channel configurations.

In connectionless channel data frame structure, each data frame contains information bits field and a Cyclic Redundancy Check (CRC) field. CRC is encoded by the mobile station and used by the base station to verify errors in the received data frame. If CRC check fails, the base station marks this frame as un-decoded frame. If one of received frames is un-decoded, the base station marks the probe as partially decoded.

Figure 6:
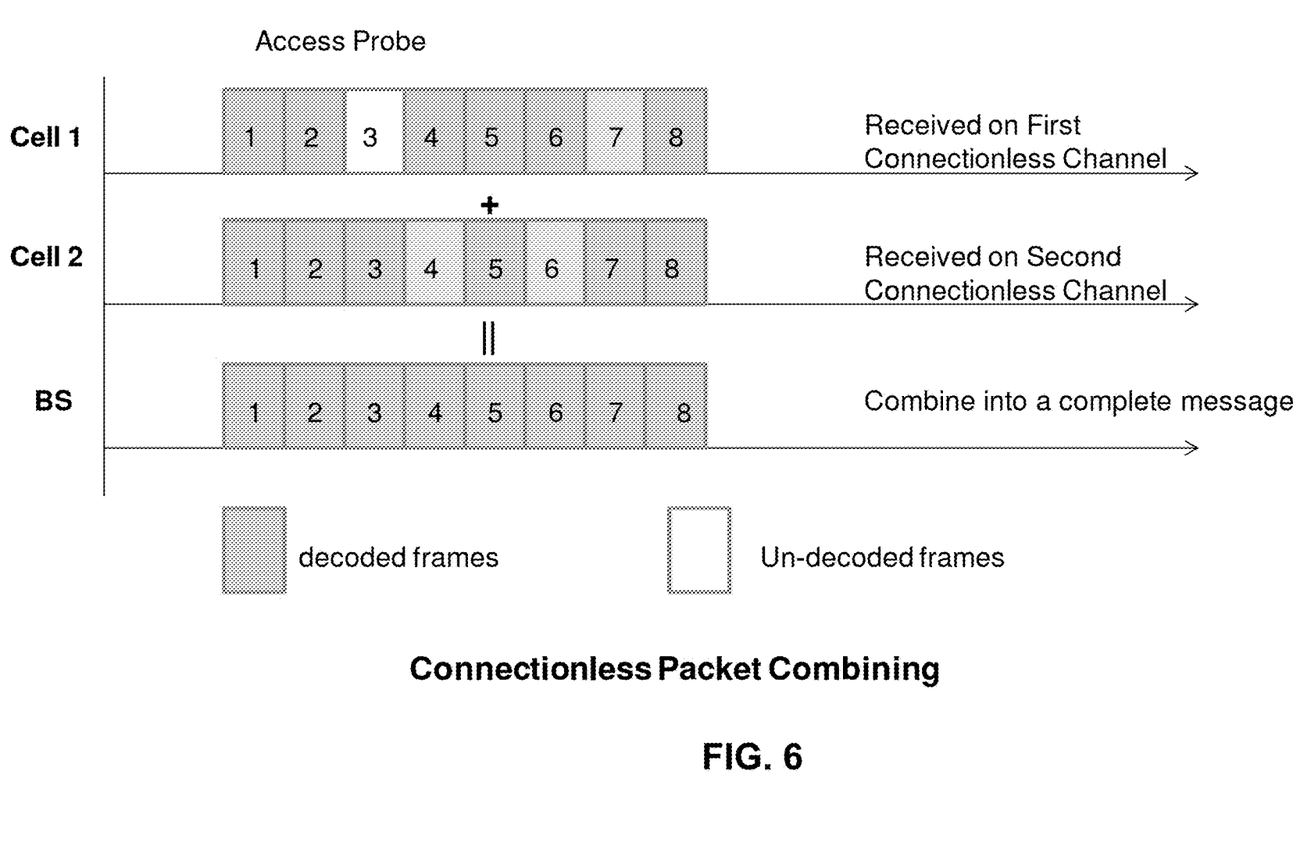
FIG. 6 shows an example mechanism of reassembling/combining the partially decoded connectionless packets at a base station.

FIG. 6 shows an example of mechanism for re-assembling partially decoded connectionless packets. One connectionless channel is configured in Cell 1 using its long code mask the cell. The second connectionless channel is configured in another cell, Cell 2, using the same long code mask of Cell 1. Cell 1 or Cell 2 could be a sector of base station. These connectionless channels could be allocated in different channel elements of the base station. When a mobile station transmits a connectionless probe over Cell 1's connectionless channel, both Cell 1 and Cell 2 may detect and acquire the transmission simultaneously due to provisioning with the same reverse link connectionless channel long code mask. When the Cell 1 acquires a connectionless probe over the first connectionless channel, it may partially decode the connectionless probe. For example, the frames 3 and 7 are not able to decode due to CRC failure and marked as un-decoded frames, while other frames are decoded successfully. The probe over Cell 1 is marked as partially decoded. Meanwhile the Cell 2 may acquire the connectionless probe over the second connectionless channel, and partially decode the probe as well. The frames 4 and 6 are marked as un-decoded frames due to CRC failure. Therefore both cells can partially decode the connectionless probe, but not a complete.

Then Cell 1 and Cell 2 channel elements pass those partially decoded connectionless data frames to the MAC/LAC layer of the base station with an array of Frame Quality which indicates decoding status of each frame in the connectionless probe. Frame_Quality[i] means the CRC check on the ith frame. Frame_Quality[i]=1 means the ith frame passes the CRC check. If the MAC/LAC of base station receives connectionless frames from two or more channel elements, it combines or re-assemble connectionless frames according to their Frame Quality Indications. MAC/LAC chooses the ith frame with Frame Quality=1 from either first or second connectionless channel and keeps it in the ith frame of the integrated frame buffer, and then set Frame Quality Indication of the ith frame set to 1. If some frames are marked as un-decoded frames with Frame Quality="0" by both Cell 1 and Cell 2, then MAC/LAC leaves those frames in the integrated frame buffer as un-decoded with Frame Quality="0". If none of Frame Quality in the integrated frames is set "0", the MAC/LAC layer will send an indication to the upper layer to trigger the base station to send a BS Ack Order message to the mobile station to stop the transmission. Otherwise, the base station may wait for re-transmitted connectionless data packet to continue partial-decoded packet combining.

The connectionless channel can support multiple transmission data rates such as 1.2 kbps, 2.4 kbps, 4.8 kbps, 9.6 kbps, 192. kbps and 38.4 kbps. Different transmission data rates correspond to different payload sizes in a frame. For example, the frame for transmission data rates 2 kbps, 2.4 kbps, 4.8 kbps, 9.6 kbps, 192. kbps and 38.4 kbps can carry packet payload of 16, 40, 80, 172, 360, 744 bits in a frame respectively.

When the physical layer channel element of base station decodes connectionless data frames partially, it needs to send to the upper layers with the information of the packet sizes (FRAME_SIZE) or data rate (DATA_RATE) in a frame and additional frame quality indication (ADDL_FRAME_QUALITY) of each frame, with the decoded packet data (SDU), the total size of packet data (NUM_BITS), frame quality indication (FRAME_QUALITY) of the connectionless probe.

With all this information, the upper layer protocols can combine packet data received from the primary and secondary connectionless channel(s) to eliminate un-decoded frames in the connectionless probe.

Figure 7:
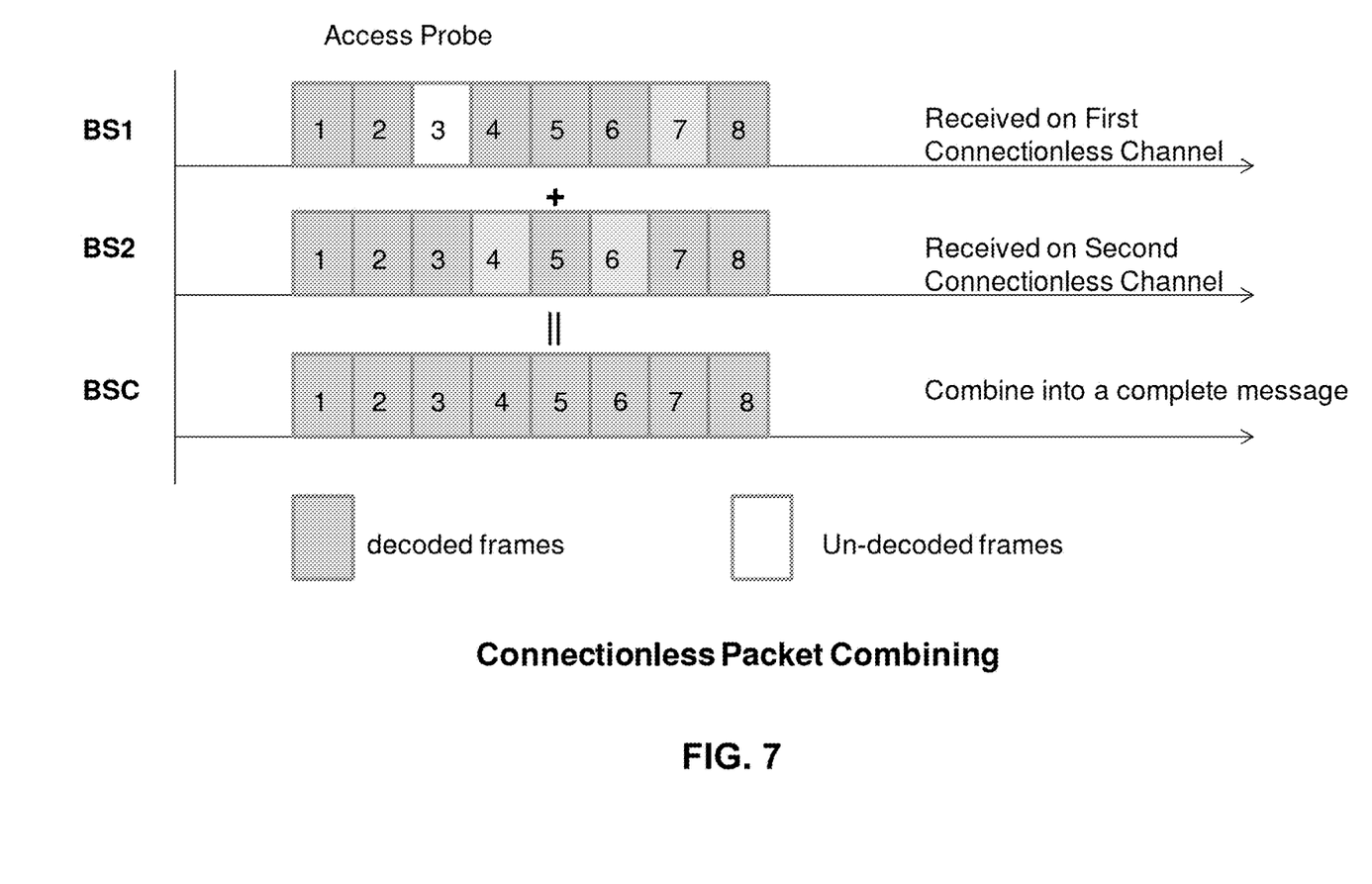
FIG. 7. shows an example of mechanism of reassembling the partially decoded connectionless packets across different base stations.

FIG. 7 shows another example of mechanism for partially decoded connectionless packet combining across different base stations. One connectionless channel is configured in BS1 using its long code mask of BS1. The second connectionless channel is configured in BS2 using the same long code mask of BS1. When a mobile station transmits a connectionless probe over the first connectionless channel, both BS1 and BS2 may detect and acquire the transmission simultaneously. When BS1 acquires a connectionless probe over the first connectionless channel, it may partially decode the connectionless probe. For example, two frames 3 and 7 are not able to decode due to CRC failure and marked as un-decoded frames, while other frames are decoded successfully. Meanwhile BS2 may acquire a connectionless probe over the second connectionless channel, and partially decode the probe. The frames 4 and 6 are marked as un-decoded frames due to CRC failure. Therefore both base stations may only partially decode the connectionless probe, but not completely.

BS1 and BS2 send their partially decoded connectionless data frames to the BSC with an array of Frame Quality which indicates decoding status of each frame of the connectionless probe. When the BSC receives connectionless frames from BS1 and BS2, it combines connectionless frames according to their Frame Quality indications. The BSC chooses frames with Frame Quality=1 from either BS1 or BS2, and saves them in the integrated frame buffer with Frame Quality indication set to 1. If some frames are marked as un-decoded frames with Frame Quality="0" by both BS1 and BS2, then BSC shall leave those frames in the integrated frame buffer as un-decoded with Frame Quality="0". If all the Frame Quality indications of integrated frames are set "1"s, the BSC shall send a BS Ack Order Request message to BS1 to request it to send a BS Ack Order message to the mobile station to stop the transmission. Otherwise, the BSC may wait for re-transmitted connectionless data packets to continue partial decoded packet combining.

Figure 8:
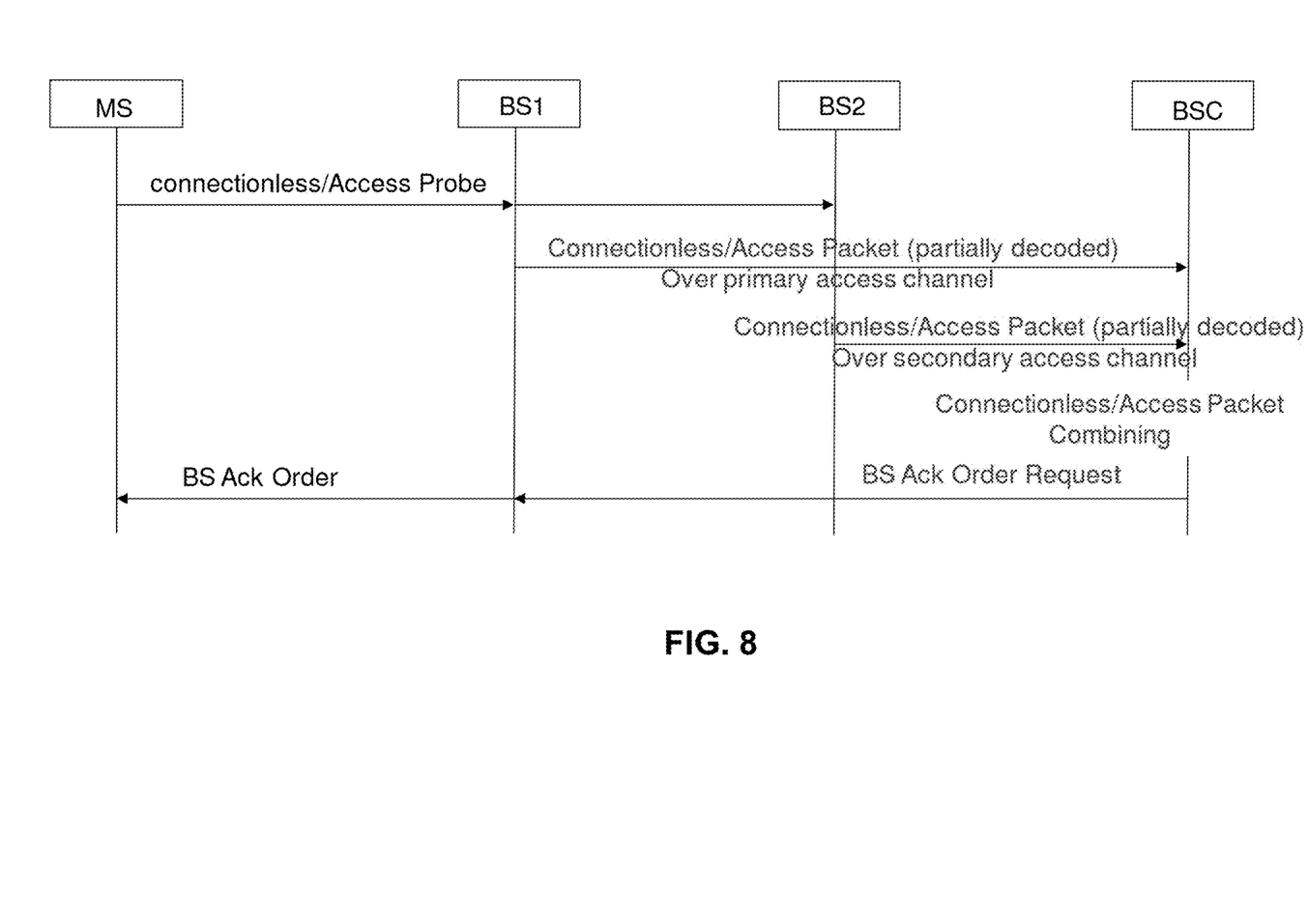
FIG. 8 shows an example of message flow for reassembling/combining partially decoded connectionless packet by BSC.

FIG. 8 shows an example of message flow for combining partially decoded connectionless packet by BSC.

In the existing wireless specification such as 3GPP or 3GPP2, it defines that the mobile station transmits the random access probe over the reverse link on the same cell which it is monitoring on the forward link. The cell which a mobile station is monitoring depends on the pilot signal on forward link of the cell and its neighbor cells. In other word, the existing specification always assumes the best forward link serving cell/sector is the best reverse link serving cell/sector. However in the typical deployment scenario, the forward and reverse link serving cells/sectors are not balanced, i.e. the best forward link serving sector to a mobile station might not be its best reveres link serving sector. This imbalance of forward and reverse links serving sectors might cause the mobile station extra transmit power or re-transmit the unnecessary access probe.

For example: the best reverse link to the mobile station is with BS1, but the best forward link could be with BS2. If the mobile station camped at BS2 according to the pilot measurement, the mobile station may need transmitting the connectionless probe twice before the BS2 receives it. However, the connectionless probe may be received by BS1 at first time. If BS1 would pass the receipt information to BS2 and let BS2 to send ACK to MS, it would avoid transmitting the second connectionless probe.

In order to improve the imbalance between forward link and reverse link serving sectors, it is necessary to separate the best forward and reverse link serving sectors and response transmission mechanism. Since all the radio networks surrounding to the mobile station uses the same public long code mask for the reverse link connectionless channel, it will already guarantee the radio network(s) with the best reverse link will receive the connectionless (access) probe first.

To have the radio network know the best forward link sector in a connectionless probe transmission, the mobile station could explicitly include the Forward Link Serving sector (FLSS) information in the connectionless (access) probe message, or implicitly through the receiving base station. When the best reverse link serving sector receives the connectionless (access) probe message, it may pass the receipt indication to the serving radio network through BSC. The forward link serving radio network will send an ACK to the mobile station as shown in FIG. 5.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   receiving, by a base station, partially decoded frames with frame quality values that indicate decoding status of the partially decoded frames, wherein
      the partially decoded frames and the frame quality values are received based on a decoding of one or more frames of a connectionless access probe by a first base station and a second base station in a wireless network,
      the partially decoded frames comprises one or more successfully decoded frames and one or more un-decoded frames, and
      the frame quality values derived for each partially decoded frame are based on a passing cyclic redundancy check (CRC) condition or a failing CRC condition;
   assembling a complete message in an integrated frame buffer comprising one or more frames by:
      choosing, from the partially decoded frames, frames having frame quality values based on the passing CRC condition from either the first or the second base stations;
      setting, for the frames chosen as part of the integrated frame buffer, frame quality values based on the passing CRC condition;
      leaving one or more frames of the integrated frame buffer as un-decoded when both the first and the second base stations indicate the failing CRC condition for one or more partially decoded frames; and
   sending, when the frame quality values of each frame of the integrated frame buffer indicates the passing CRC condition, an acknowledgement of the receiving of the connectionless access probe to the first and the second base stations to send to a mobile station that transmitted the connectionless access probe another acknowledgement to stop transmission of the connectionless access probe.

2. The method of claim 1, wherein the connectionless access probe comprises a Forward Link Serving Sector information.

3. The method of claim 1, further comprising:
   passing a reception indication message from the first base station to a base station controller over a network connection.

4. A method of processing uplink transmissions from mobile stations, the method implemented at a base station controller in a wireless communication network, the method comprising:
   receiving a first message with a first set of frame quality values from a first base station, the first message including a first set of connectionless frames received by the first base station from a mobile station, the first set of connectionless frames is partially decoded to include a successfully decoded frame and an un-decoded frame, the first set of frame quality values derived for the first set of connectionless frames are based on a passing cyclic redundancy check (CRC) condition or a failing CRC condition;
   receiving a second message with a second set of frame quality values from a second base station, the second message including a second set of connectionless frames received by the second base station from the mobile station, the second set of connectionless frames is partially decoded to include a successfully decoded frame and an un-decoded frame, the second set of frame quality values derived for the second set of connectionless frames are based on the passing cyclic redundancy check (CRC) condition or the failing CRC condition;
   assembling a complete connectionless message comprising one or more frames by:
      choosing, from the partially decoded first and the second set of connectionless frames, frames having frame quality values based on the passing CRC condition;
      setting, for the frames chosen as part of the complete connectionless message, frame quality values based on the passing CRC condition;
      leaving one or more frames of the complete connectionless message as un-decoded when both the first and the second base stations indicate the failing CRC condition for one or more partially decoded frames of the first and the second set of connectionless frames; and
   selectively directing, when the frame quality values of each frame of the complete connectionless message indicates the passing CRC condition, one of the first base station and the second base station to acknowledge the mobile station to stop transmission of connectionless frames.

5. The method of claim 4, further comprising:
   saving received connectionless frames to an integrated frame buffer.

6. The method of claim 4, further comprising:
   receiving re-transmitted connectionless frames.

7. An apparatus for wireless communications, comprising:
- means for receiving, by a base station, partially decoded frames with frame quality values that indicate decoding status of the partially decoded frames, wherein
  - the partially decoded frames and the frame quality values are received based on a decoding of one or more frames of a connectionless access probe by a first base station and a second base station in a wireless network,
  - the partially decoded frames comprises one or more successfully decoded frames and one or more un-decoded frames, and
  - the frame quality values derived for each partially decoded frame are based on a passing cyclic redundancy check (CRC) condition or a failing CRC condition;
- means for assembling a complete message in an integrated frame buffer comprising one or more frames by:
  - choosing, from the partially decoded frames, frames having frame quality values based on the passing CRC condition from either the first or the second base stations;
  - setting, for the frames chosen as part of the integrated frame buffer, frame quality values based on the passing CRC condition;
  - leaving one or more frames of the integrated frame buffer as un-decoded when both the first and the second base stations indicate the failing CRC condition for one or more partially decoded frames; and
- means for sending, when the frame quality values of each frame of the integrated frame buffer indicates the passing CRC condition, an acknowledgement of the receiving of the connectionless access probe to the first and the second base stations to send to a mobile station that transmitted the connectionless access probe to stop transmission of the connectionless access probe.

8. The apparatus of claim 7, wherein the connectionless access probe comprises a Forward Link Serving Sector information.

9. The apparatus of claim 7, further comprising:
means for passing a reception indication message from the first base station to a base station controller over a network connection.

10. A base station controller apparatus in a wireless communication network implementing a method of combining uplink transmissions from mobile stations, the method comprising:
- receiving a first message with a first set of frame quality values from a first base station, the first message including a first set of connectionless frames received by the first base station from a mobile station, the first set of connectionless frames is partially decoded to include a successfully decoded frame and an un-decoded frame, the first set of frame quality values derived for the first set of connectionless frames are based on a passing cyclic redundancy check (CRC) condition or a failing CRC condition;
- receiving a second message with a second set of frame quality values from a second base station, the second message including a second set of connectionless frames received by the second base station from the mobile station, the second set of connectionless frames is partially decoded to include a successfully decoded frame and an un-decoded frame, the second set of frame quality values derived for the second set of connectionless frames are based on the passing cyclic redundancy check (CRC) condition or the failing CRC condition;
- assembling a complete connectionless message comprising one or more frames by:
  - choosing, from the partially decoded first and the second set of connectionless frames, frames having frame quality values based on the passing CRC condition;
  - setting, for the frames chosen as part of the complete connectionless message, frame quality values based on the passing CRC condition;
  - leaving one or more frames of the complete connectionless message as un-decoded when both the first and the second base stations indicate the failing CRC condition for one or more partially decoded frames of the first and the second set of connectionless frames; and
- selectively directing when the frame quality values of each frame of the complete connectionless message indicates the passing CRC condition, one of the first base station and the second base station to acknowledge the mobile station to stop transmission of connectionless frames.

11. The apparatus of claim 10, further comprising:
saving received connectional frames to an integrated frame buffer.

12. The apparatus of claim 10, further comprising:
receiving re-transmitted connectionless frames.

13. A wireless communication system comprising:
- a mobile station, multiple base stations and a base station controller;
- the mobile station transmits a connectionless access probe comprising multiple frames to the multiple base stations;
- the multiple base stations receive and decode multiple frames of the connectionless access probe from the mobile station and forward information about the received and decoded frames with frame quality values to the base station controller, the decoding of the multiple frames causing the connectionless access probe to be partially decoded with one or more successfully decoded frames and one or more un-decoded frames, and the frame quality values derived for the frames of the connectionless access probe are based on a passing cyclic redundancy check (CRC) condition or a failing CRC condition; and
- the base station controller receives the information from the multiple base stations, assembles a complete connectionless message comprising one or more frames by:
  - choosing, from the partially decoded connectionless access probes, frames having frame quality values based on the passing CRC condition;
  - setting, for the frames chosen as part of the complete connectionless message, frame quality values based on the passing CRC condition;
  - leaving one or more frames of the complete connectionless message as un-decoded when the multiple base stations indicate the failing CRC condition for one or more frames of the partially decoded connectionless access probes, and
  - selectively instructs when the frame quality values of each frame of the complete connectionless message indicates the passing CRC condition a base station to provide an acknowledgement to the mobile station to stop the transmission of the connectionless access probe.

14. The wireless communication system of claim 13, wherein the selectively instructed base station has a best forward link to the mobile station.

15. The wireless communication system of claim 13, wherein the connectionless access probe comprises a Forward Link Serving Sector information.

16. The wireless communication system of claim 13, wherein:
the multiple base stations pass a reception indication message to the base station controller over a network connection.

17. The wireless communication system of claim 16, wherein, the receiving base station marks one or more frames of the connectionless access probe as an un-decoded frame in the reception indication message.

18. The wireless communication system of claim 13, wherein the mobile station transmits the connectionless access probe using a long code mask of a first base station and wherein the mobile station receives a corresponding acknowledgement from a second base station, different from the first base station, as directed by the base station controller.

* * * * *